United States Patent [19]

Pfleger

[11] Patent Number: 5,560,398
[45] Date of Patent: Oct. 1, 1996

[54] SEQUENTIALLY COEXTRUDED COOLANT CONDUIT

[75] Inventor: Wolfgang Pfleger, Tamins, Switzerland

[73] Assignee: EMS-INVENTA AG, Zürich, Switzerland

[21] Appl. No.: 361,673

[22] Filed: Dec. 22, 1994

[30] Foreign Application Priority Data

Dec. 23, 1993 [DE] Germany ............................ 9319879 U

[51] Int. Cl.$^6$ .................................................. F16L 11/15
[52] U.S. Cl. .......................... 138/121; 138/137; 138/141; 138/DIG. 2; 138/DIG. 3; 138/DIG. 7
[58] Field of Search ....................... 138/121, 137, 138/DIG. 2, DIG. 3, DIG. 7, 141

[56] References Cited

U.S. PATENT DOCUMENTS

| | | | |
|---|---|---|---|
| 3,900,048 | 8/1975 | Isham et al. | 138/DIG. 2 |
| 3,917,898 | 11/1975 | Iketani et al. | 138/137 |
| 3,990,479 | 11/1976 | Stine et al. | 138/DIG. 7 |
| 3,998,715 | 12/1976 | Bohm et al. | 204/159.16 |
| 4,165,765 | 8/1979 | Gilbu et al. | 138/DIG. 7 |
| 4,167,953 | 9/1979 | Carlstrom | 138/DIG. 2 |
| 4,867,269 | 9/1989 | Lalikos et al. | 138/137 |
| 5,024,667 | 6/1991 | Malcolm et al. | 604/382 |
| 5,062,456 | 11/1991 | Cooke et al. | 138/DIG. 3 |
| 5,170,011 | 12/1992 | Martucci | 138/137 |
| 5,284,184 | 2/1994 | Noone et al. | 138/137 |

FOREIGN PATENT DOCUMENTS

| | | |
|---|---|---|
| 428834A2 | 5/1991 | European Pat. Off. . |
| 436923A2 | 7/1991 | European Pat. Off. . |
| 470605A1 | 2/1992 | European Pat. Off. . |
| 9203865 U | 11/1992 | Germany . |
| 63-158382 | 7/1988 | Japan . |
| 4224384 | 8/1992 | Japan . |

Primary Examiner—David Scherbel
Assistant Examiner—James F. Hook
Attorney, Agent, or Firm—Spencer & Frank

[57] ABSTRACT

A coolant conduit which is an elongate tubular article for an apparatus requiring cooling by a cooling agent, such as an engine, for example, an internal combustion engine, includes a plurality of layers which are provided by sequential coextrusion thereof and which are adjoined thereby, each layer of the plurality being comprised of a polymeric material which is thermoplastically processable. The plurality of layers may include an inner layer which is composed of a polymeric material which is substantially inert to cooling agent and which is substantially non-swelling, and an outer layer which is composed of at least one polyamide and which is pressure resistant. The coolant conduit may include a plurality of longitudinal sections, and at least one layer of the plurality of layers may then be composed of a polymeric material which differs between longitudinal sections thereof as is made possible by sequential coextrusion thereof.

16 Claims, 2 Drawing Sheets

SEQUENTIALLY COEXTRUDED COOLANT CONDUIT

CROSS REFERENCE TO RELATED APPLICATIONS

The present application claims the right of foreign priority with respect to Application No. G 93 19 879.5 filed in Germany on Dec. 23, 1993, the subject matter of which is incorporated herein by reference.

BACKGROUND OF THE INVENTION

1. Field of the Invention

The invention relates to a coolant conduit comprising a plurality of polymer layers that has a high resistance to hydrolysis and a high resistance to pressure which conveys a high bursting strength. In particular, the invention relates to a coolant conduit which is an elongate tubular article for an apparatus such as an engine, for example, an internal combustion engine, of a vehicle requiring cooling by a cooling agent.

2. Description of the Related Art

Coolant conduits do not have simple shapes as a rule, but rather have bizarre shapes and are often constructed from metal parts and elastic intermediate parts in order to compensate for vibration of the engine which can sometimes be very intense. In accordance with the prior art, rubber conduits reinforced with woven fibers (textiles) have been used for this purpose. Such rubber conduits have been preferably used for vehicle engines but have the disadvantage that they are relatively expensive and, despite this, do not completely fulfill the requirements, particularly with respect to stability at the high temperatures occurring in an engine compartment. The mechanical properties of such rubber coolant conduits deteriorate sharply after a vehicle engine service life corresponding to approximately 100,000 kilometers traveled. Stability of such rubber coolant conduits for future automobile engines will become even more critical, because future automobile engines will allow the temperatures in the engine compartment to rise even higher than they have up to now thereby accelerating deterioration in the mechanical properties of coolant conduits.

Cooling water conduits composed of a single polymer layer, so called "monotubes", have only been used to a limited extent up to now. At temperatures above 100° C., monotubes made of polyolefins exhibit an inadequate pressure resistance. At temperatures above 100° C., monotubes made of polyamides exhibit a reduced resistance to hydrolysis.

For this reason, polyamide reinforced with glass fiber has preferably been used up to now for parts that come directly into contact with coolants, because the glass fibers can partially compensate for the loss of mechanical properties of the polyamide, e.g., due to swelling. Glass fiber-reinforced conduits are often insufficiently flexible.

Tubular, multilayer coolant conduits are known and have been produced by coextrusion according to EP 0 436 923, the disclosure of which is incorporated herein by reference. These coolant conduits have corrugated walls and are flexible, but have only limited application, however, because their use is limited by the polymer combination selected.

It is therefore an object of the present invention to create a coolant conduit that does not have the forenamed disadvantages.

SUMMARY OF THE INVENTION

This and other objects are accomplished by the present invention which provides a coolant conduit which is an elongate tubular article for an apparatus requiring cooling by a cooling agent, comprising a plurality of layers which are provided by sequential coextrusion thereof and which are adjoined thereby, each layer of the plurality being comprised of a polymeric material which is thermoplastically processable. The coolant conduit may advantageously include a plurality of longitudinal sections having different profiles, i.e., corrugated and non-corrugated, in which at least one layer of the plurality of layers is comprised of a polymeric material which differs between longitudinal sections thereof. Thus, especially preferred are coolant conduits whose functional layers are composed, by section, of polymeric materials which are adapted to the particular function of the respective section, for example, an outer layer composed of polymeric materials which are more flexible in corrugated sections than in non-corrugated sections.

Each layer of the plurality of layers may advantageously be comprised of a polymeric material which is different from that of other layers of the adjoined plurality of layers and respective polymeric materials may have a flexibility which differs from that of other layers of the adjoined plurality of layers. Thus, coolant conduits according to the invention advantageously may have functional layers composed of polymeric materials adapted to the function of the layer and, within a given layer, may have longitudinal section(s) thereof composed of a modified polymeric material or even a substantially different polymeric material adapted to a different function of the longitudinal section(s). This is made possible by the sequential coextrusion of the plurality of layers. That is, the layers are coextruded sequentially, instead of simply being simultaneously coextruded, and during the discharge of a given layer, the composition of the layer may be varied, even dramatically, over the length of the coextruded article.

The plurality of layers may advantageously comprise an inner layer which is comprised of a polymeric material which is substantially inert to cooling agent and which is substantially non-swelling, and an outer layer which is comprised of at least one polyamide and which is pressure resistant, i.e., has a high resistance to pressure which conveys a high bursting strength, that is, bursting resistance.

The coolant conduit may advantageously include a plurality of longitudinal sections, and the outer layer may then be comprised of at least one polyamide which differs between longitudinal sections, at least one longitudinal section being comprised of at least one polyamide which is reinforced with fibers, such as glass fibers, and at least one longitudinal section being comprised of at least one polyamide which is not reinforced with fibers.

The at least one polyamide of the outer layer may be selected from the group consisting of homopolyamides and copolyamides. As used herein, "at least one" is intended to include blends, mixtures and mixtures of blends. Thus, for example, "at least one polyamide" is meant to include a homopolyamide, a blend of homopolyamides, a copolyamide, a blend of copolyamides, and mixtures of any of the foregoing.

The homopolyamides and copolyamides of the at least one polyamide may advantageously comprise units of at least one monomer selected from the group consisting of (a) linear, aliphatic monomers having 6 to 12 C atoms, (b) aromatic monomers having 6 to 12 C atoms, and (c) cycloaliphatic monomers having 6 to 20 C atoms.

The inner layer may advantageously be comprised of a polymeric material which is at least one polymer selected from the group consisting of polyolefins and copolyolefins, which at least one polymer may be halogenated or non-halogenated and includes at least one functional group which causes the inner layer to be compatible with the outer layer.

The inner layer may advantageously be comprised of at least one polymer selected from the group consisting of polyolefins having grafted α-unsaturated dicarboxylic acids or their derivatives, and copolyolefins having grafted α-unsaturated dicarboxylic acids or their derivatives, and then the inner layer is compatible with the outer layer.

The inner layer may advantageously be comprised of a polymeric material which is at least one polymer selected from the group consisting of homopolyolefins and copolyolefins, which at least one polymer may be halogenated or non-halogenated and is not compatible with the outer layer. Then, the coolant conduit further comprises an intermediate layer which is compatible with the inner layer and with the outer layer, and which is disposed between the inner layer and the outer layer.

In another embodiment of the invention, one layer selected from the group consisting of (a) the inner layer and (b) the intermediate layer may be comprised of at least one olefin selected from the group consisting of polyolefins and copolyolefins, which at least one olefin is provided with functional groups by means of one of grafting or copolymerization.

The inner layer may advantageously be comprised of at least one polymer selected from the group consisting of (a) homopolyolefins which are one of chlorinated or fluorinated, (b) copolyolefins which are one of chlorinated or fluorinated, (c) PVC (polyvinyl chloride), and (d) blends of at least one of (a), (b), and (c).

Preferably, the inner layer is comprised of at least one polymer selected from the group consisting of ETFE (ethylene-tetrafluoroethylene copolymer), PTFE (propylene-tetrafluoroethylene copolymer), PVDP (polyvinylidene fluoride), PPS (polyphenylene sulfide), PPE (polypropylene ether), POM (polyoxymethylene), PBT (polybutyleneterephthalate), EVOH (hydrolyzed ethylene-vinyl acetate copolymer), and EVA (ethylene-vinyl acetate copolymer).

The coolant conduit has a total wall thickness, and the outer layer may advantageously have a wall thickness which ranges from about 10% to about 95% of the total wall thickness, preferably, from about 25% to about 95% of the total wall thickness.

The coolant conduit may advantageously have a wall including at least one non-corrugated longitudinal section and at least one corrugated longitudinal section which is corrugated with one of annular corrugation or spiral-shaped corrugation. In such an embodiment, the inner layer may advantageously be comprised of at least one polymer selected from the group consisting of maleic acid-grafted polyolefins and maleic acid-grafted copolyolefins. Moreover, the non-corrugated longitudinal section of the outer layer may advantageously be comprised of highly viscous polyamide 6 or 12, or reinforced polyamide types, such as fiber-reinforced highly viscous polyamide 6 or 12 in which the fiber may be, for example, glass fiber. The corrugated longitudinal section of the outer layer may advantageously be comprised of one of (a) a copolyamide having a modified flexibility or (b) a blend of a copolyamide having a modified flexibility with at least one of highly viscous polyamide 6 and highly viscous polyamide 12. The term "highly viscous polyamide" refers to a polyamide having a viscosity above 10,000 pa.s (Pascal seconds).

The plurality of layers may have a wall thickness ratio which varies over the length of the coolant conduit, each of the respective plurality of layers having a wall thickness.

The coolant conduit may advantageously be employed in an apparatus which is an engine, such as an internal combustion engine of a motor vehicle.

DESCRIPTION OF THE PREFERRED EMBODIMENTS

Figure 1:
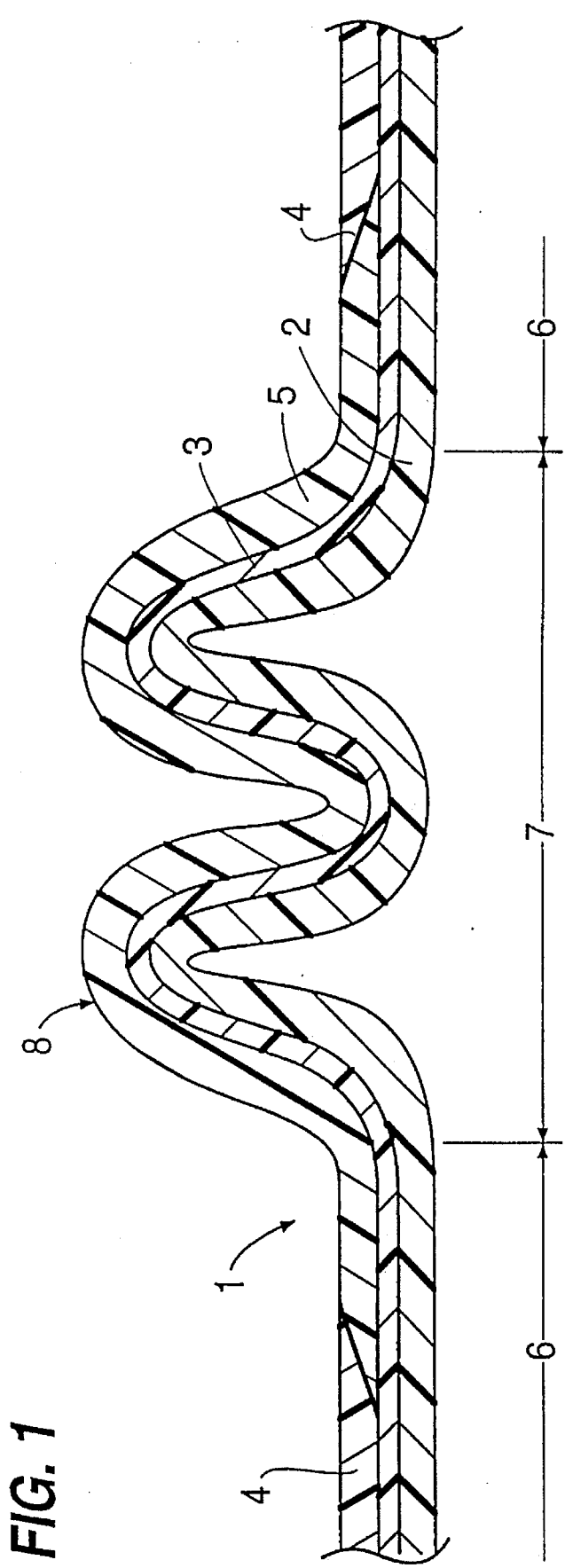
FIG. 1 is a partial longitudinal cross-section of a three-layer, corrugated coolant conduit according to the invention.
Figure 2:
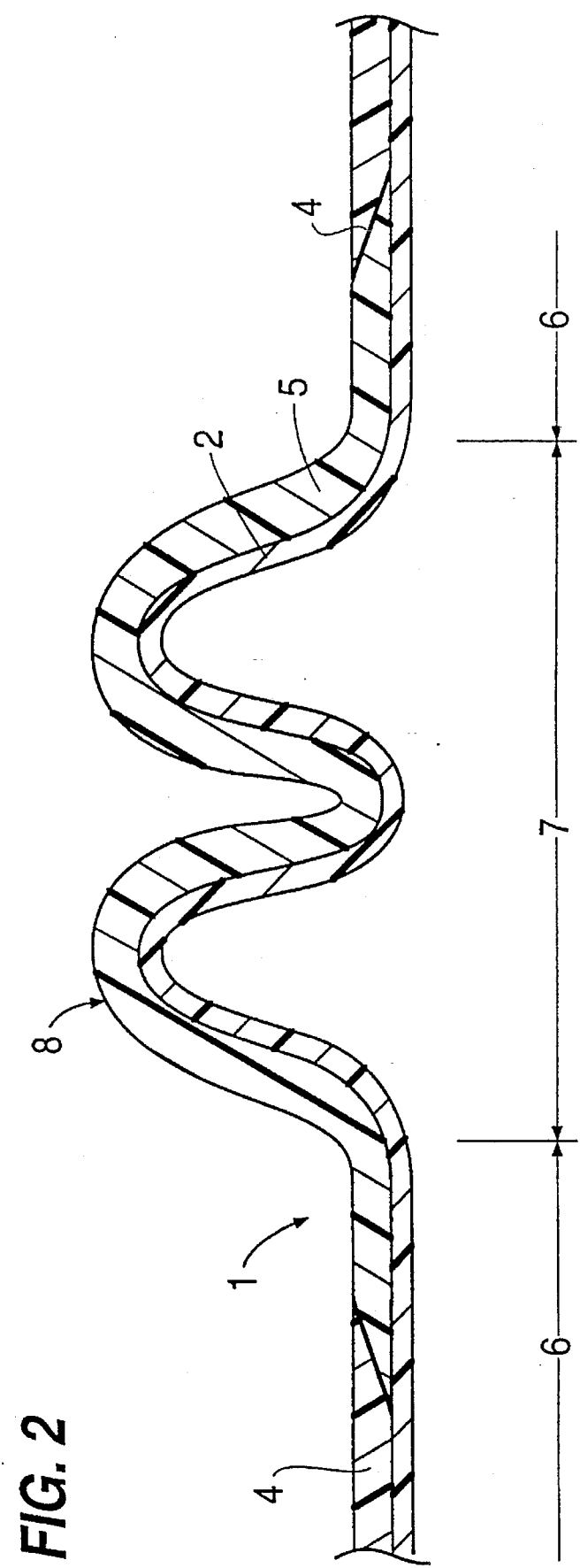
FIG. 2 is a partial longitudinal cross-section of a two-layer, corrugated coolant conduit according to the invention.

It was found that multilayer coolant conduits having a combination of differently-acting layers of suitable polymers are particularly suitable as coolant conduits. That is, coolant conduits having an inner layer that is inert to and does not swell in cooling agents, and having an outer layer which is rigid and supporting, and has a high pressure resistance affording high bursting strength, have been found to be particularly advantageous. Such layers must be compatible with each other, either inherently or by compatibilization, or be connected by an intermediate layer positioned between the inner layer and the outer layer which is compatible with these two layers.

Further, it was found that coolant conduits whose walls are corrugated in an annular or spiral shape, at least over selected longitudinal sections, are particularly suited for use as coolant conduits for engines, especially motor vehicle engines. Such conduits according to the invention are preferably provided with corrugation of their multilayer wall in a manner which is well known in the art following the sequential coextrusion of their layers from different polymers respectively and within individual layers by section.

Multilayer conduits having a polyolefin inner layer and a polyamide outer layer are particularly preferred. The polyolefin inner layer does not swell in cooling agent and assures superior resistance to hydrolysis. The polyamide outer layer assures a high pressure resistance affording a high bursting strength and allows attainment of the bursting strength values required by automobile manufacturers. Thus, textile reinforcement of coolant conduits as used in rubber coolant conduits of the prior art is no longer required.

The coolant conduits of the invention are distinguished by the fact that their layers are made of polymers having different degrees of flexibility, and that the flexibility of the line can be varied by the use of different polymers by longitudinal sections.

The coolant conduits according to the invention are significantly more flexible than the reinforced rubber coolant conduits according to the prior art. Experience has shown that bending of smooth, i.e., non-corrugated, cylindrical conduits, lines, tubes or pipes of solid polymeric materials causes kinking at relatively large diameters.

Coolant conduits whose walls have been at least partially corrugated by any well known method of the prior art, e.g., into annular-shaped corrugations or spiral-shaped corrugations, have a particularly advantageous flexibility that permits even severe curvatures in a narrow space, These conduits, moreover, may advantageously comprise even more flexible polymers in corrugated regions than in non-corrugated regions.

Additional advantages of coolant conduits according to the invention include reduced weight and lower cost of production.

Polyamides are materials which are particularly suitable for the outer layer, which must be pressure resistant and afford high bursting strength. Preferable homopolyamides or copolyamides include those made of (a) linear, aliphatic monomers having 6 to 12 C atoms, for example, lactams, amino carboxylic acids, diamines and dicarboxylic acids, (b) aromatic monomers having 6 to 12 C atoms, for example, alkylated or non-alkylated, aromatic diamines or dicarboxylic acids, and such, and (c) cycloaliphatic monomers, such as alkylated diamines or dicarboxylic acids, having 6 to 20 C atoms, particularly those having one or a plurality of cyclohexane rings which may be connected via alkylene groups. An example is the semicrystalline polyamides of the series PA 6 through PA 12 and the series PA 6,6 through PA 6,12, and the series PA 12,6 through PA 12,12. Blends, mixtures, and mixtures of blends of the named polyamides are also suitable, with grades having high viscosities.

Suitably inert, swelling-resistant polymers for the inner layer include halogenated or non-halogenated homopolyolefins or copolyolefins, or mixtures or blends or mixtures Of blends thereof. In addition to homopolyolefins, the copolyolefins of ethylene or propylene with further α-olefins are preferred. Chlorinated and fluorinated, preferably fluorinated, polyolefins and copolyolefins, as well as polyvinyl chloride, are suitable. Blends of polyolefins and crosslinked or partially crosslinked elastomers are of particular advantage. For two-layered coolant conduits, the homopolyolefins or copolyolefins of the inner layer must themselves include reactive groups that make them compatible with the polyamide material of the outer layer. This compatibility can be attained through grafting thereof with α-unsaturated acids or their derivatives, or through suitable comonomers, such as acrylic acids or methacrylic acids, or their derivatives.

The inner layer can preferably comprise polymers of the group ETFE, PTFE, PVDF, PPS, PPE, POM, PBT, EVOE, and EVA, and their blends.

The inner layer can, however, alternatively be connected with sufficient security to the outer layer by interposing therebetween an intermediate layer that is compatible with both of these two layers. Also particularly suited for this intermediate layer are polyolefins or copolyolefins that have been provided with reactive groups, such as, particularly carboxyl anhydride groups or acid anhydride groups, through grafting or through copolymerization with the named comonomers.

The coolant conduit has a total wall thickness, and the bursting pressure-resistant outer layer has a wall thickness which ranges from about 10% to about 95% of the total wall thickness, preferably from about 25% to about 95% of the total wall thickness.

A particularly preferred embodiment of the coolant conduit of the invention comprises an inner layer of maleic acid-grafted polyolefin or copolyolefin, and an outer layer of highly viscous polyamide 6 or 12 in the non-corrugated longitudinal section(s), and a copolymer modified in its flexibility or a blend of these polymer types in the corrugated longitudinal sections. In a most preferred embodiment, the outer layer in the non-corrugated longitudinal section(s) is comprised of fiber reinforced highly viscous polyamide 6 and/or 12, particularly glass fiber reinforced highly viscous polyamide 6 and/or 12, and the outer layer in the corrugated longitudinal section(s) is comprised of natural, that is, non-reinforced, highly viscous polyamide 6 and/or 12. Fiber reinforcement amounts ranging from 5 to 60% by weight, preferably from 10 to 50% by weight, based on the weight of the polyamide are useful.

Due to the combination of suitable inert material for the inner layer and rigid material for the outer layer, the coolant conduits of the invention may assume many arbitrary shapes and exhibit extensive variations in flexibility and pressure resistance or bursting strength whose values can be purposefully tailored. The flexibility, moreover, can be considerably improved by corrugation of selected adjacent longitudinal sections.

The invention is described by way of example in conjunction with FIG. 1, which shows a partial longitudinal cross-section of a three-layer, coolant conduit according to the invention which is corrugated in select longitudinal sections.

FIG. 1 shows coolant conduit 1, shown generally by arrow 1, as including an inner layer 2 which is solvent-inert, an intermediate layer 3 which is made of a bonding agent, i.e., a material which is compatible with both the inner layer 2 and an outer layer 4 which is bursting pressure-resistant.

The coolant conduit 1 has two types of longitudinal sections, a non-corrugated longitudinal section 6 which is generally cylindrical and smooth, and which is rigid, and a corrugated longitudinal section 7 which is flexible and which is provided with corrugation 8 shown generally by arrow 8. In the non-corrugated longitudinal section 6, outer layer 4 is made of a first polymeric material. In the corrugated longitudinal section 7 shown in FIG. 1, outer layer 4 is made of a second polymeric material 5.

In a preferred embodiment, the outer layer 4 in the non-corrugated, rigid longitudinal sections 6 of the coolant conduit 1 is made of polyamide 12 (PA 12) which possesses the necessary rigidity and, at the same time, a corresponding pressure resistance which provides bursting strength. The inner layer 2 is made of a polymer that is inert with respect to cooling agents including water and aqueous solutions of antifreezing agents, such as ethylene glycol, and is preferably a polyolefin. In the corrugated longitudinal section 7, the outer layer comprises an elastomeric PA 12 copolymer, e.g., an elastomeric copolymer based on lactam 12-polyether polyamide.

The wall thickness ratio of the various layers and the polymers which make up the inner or outer layers define the flexibility. In the flexible longitudinal section 7 provided with corrugation 8, the coolant conduit 1 of the invention has an outer layer 4 made of a flexible, pressure resistant, second polymeric material.

providing corrugation 8 results in a purposefully high flexibility, and the affords the possibility of bending the conduit around even small or narrow radii. Pressure resistance (bursting strength) is preset by the corrugated longitudinal section 7.

The invention advantageously provides coolant conduits having alternating flexible regions (for example, corrugated longitudinal section 7) and very rigid regions (for example, non-corrugated longitudinal section 6), which flexible regions effectively absorb vibration between the engine and the vehicle body.

The invention has been described in detail with respect to preferred embodiments, and it will now be apparent from the foregoing to those skilled in the art that changes and modifications may be made without departing from the invention in its broader aspects, and the therefore, as defined in the appended claims is intended to cover all such changes and modifications as fall within the true spirit of the invention.

What is claimed is:

1. A coolant conduit which is an elongate tubular article for an apparatus requiring cooling by a cooling agent, comprising:

a plurality of sequentially coextruded layers which are provided by sequential coextrusion thereof and which are adjoined thereby, each layer of the plurality being comprised of a polymeric material which is thermoplastically processable, wherein at least one layer of the plurality of layers has a plurality of longitudinal sections, and wherein adjacent longitudinal sections are comprised of polymeric materials which differ in composition between the adjacent longitudinal sections.

2. The coolant conduit according to claim 1, wherein the plurality of layers comprises:

an inner layer which is comprised of a polymeric material which is substantially inert to cooling agent and which ie substantially non-swelling; and an outer layer which is comprised of at least one polyamide and which is pressure resistant.

3. The coolant conduit according to claim 2, wherein the outer layer has a plurality of longitudinal sections and is comprised of at least one polyamide which differs between longitudinal sections, the plurality of longitudinal sections comprising at least one longitudinal section comprised of at least one polyamide which is reinforced with glass fibers and at least one longitudinal section comprised of at least one polyamide which is not reinforced with glass fibers.

4. The coolant conduit according to claim 2, wherein each layer of the plurality of layers is comprised of a polymeric material which is different from that of other layers of the adjoined plurality of layers, and wherein respective polymeric materials have a flexibility which differs from that of other layers of the adjoined plurality of layers.

5. The coolant conduit according to claim 2, wherein the at least one polyamide of the outer layer is selected from the group consisting of homopolyamides and copolyamides.

6. The coolant conduit according to claim 5, wherein the homopolyamides and copolyamides of the at least one polyamide comprise units of at least one monomer selected from the group consisting of (a) linear, aliphatic monomers having 6 to 12 C. atoms, (b) aromatic monomers having 6 to 12 C. atoms, and (c) cycloaliphatic monomers having 6 to 20 C. atoms.

7. The coolant conduit according to claim 2, wherein the inner layer is comprised of a polymeric material which is at least one polymer selected from the group consisting of polyolefins and copolyolefins, which at least one polymer may be one of halogenated or non-halogenated and includes at least one functional group which causes the inner layer to be compatible with the outer layer.

8. The coolant conduit according to claim 2, wherein the inner layer is comprised of at least one polymer selected from the group consisting of polyolefins having one of grafted α-unsaturated dicarboxylic acids or their derivatives, and copolyolefins having one of grafted α-unsaturated dicarboxylic acids or their derivatives, and wherein the inner layer is compatible with the outer layer.

9. The coolant conduit according to claim 2, wherein the inner layer is comprised of a polymeric material which is at least one polymer selected from the group consisting of homopolyolefins and copolyolefins, which at least one polymer may be one of halogenated or non-halogenated and is not compatible with the outer layer, and wherein the coolant conduit further comprises an intermediate layer which is compatible with the inner layer and with the outer layer, and which is disposed between the inner layer and the outer layer.

10. The coolant conduit according to claim 9, wherein one layer selected from the group consisting of (a) the inner layer and (b) the intermediate layer is comprised of at least one olefin selected from the group consisting of polyolefins and copolyolefins, which at least one olefin is provided with functional groups by means of one of grafting or copolymerization.

11. The coolant conduit according to claim 2, wherein the inner layer is comprised of at least one polymer selected from the group consisting of (a) homopolyolefins which are one of chlorinated or fluorinated, (b) copolyolefins which are one of chlorinated or fluorinated, (c) PVC, and (d) blends of at least one of (a), (b), and (c).

12. The coolant conduit according to claim 2, wherein the inner layer is comprised of at least one polymer selected from the group consisting of ETFE, PTFE, PVDF, PPS, PPE, POM, PBT, EVOH, and EVA.

13. The coolant conduit according to claim 2, wherein the coolant conduit has a total wall thickness, and wherein the outer layer has a wall thickness which ranges from about 10% to about 95% of the total wall thickness.

14. The coolant conduit according to claim 13, wherein the outer layer has a wall thickness which ranges from about 25% to about 95% of the total wall thickness.

15. The coolant conduit according to claim 2, wherein the coolant conduit has a wall including at least one non-corrugated longitudinal section and at least one corrugated longitudinal section which is corrugated with one of annular corrugation or spiral-shaped corrugation, wherein the inner layer is comprised of at least one polymer selected from the group consisting of maleic acid-grafted polyolefins and maleic acid-grafted copolyolefins, wherein the non-corrugated longitudinal section of outer layer is comprised of one of highly viscous polyamide 6 or highly viscous polyamide 12, and wherein the corrugated longitudinal section of the outer layer is comprised of one of (a) a copolyamide having a modified flexibility or (b) a blend of a copolyamide having a modified flexibility with at least one of highly viscous polyamide 6 and highly viscous polyamide 12.

16. The coolant conduit according to claim 1, wherein the coolant conduit has a wall including at least one non-corrugated longitudinal section and at least one corrugated longitudinal section which is corrugated with one of annular corrugation or spiral-shaped corrugation.

* * * * *